(12) United States Patent
Lu et al.

(10) Patent No.: US 10,305,379 B2
(45) Date of Patent: May 28, 2019

(54) CONTROL CIRCUIT FOR COMPENSATING OUTPUT LOSS OF A POWER CONVERTER AND METHOD THEREOF

(71) Applicant: Leadtrend Technology Corp., Hsinchu County (TW)

(72) Inventors: Hsin-Hung Lu, Hsinchu County (TW); San-Yi Li, Hsinchu County (TW)

(73) Assignee: Leadtrend Technology Corp., Hsinchu County (TW)

( * ) Notice: Subject to any disclaimer, the term of this patent is extended or adjusted under 35 U.S.C. 154(b) by 33 days.

(21) Appl. No.: 15/716,537

(22) Filed: Sep. 27, 2017

(65) Prior Publication Data
US 2018/0234013 A1 Aug. 16, 2018

(30) Foreign Application Priority Data

Feb. 14, 2017 (TW) .............................. 106104721 A (51) Int. Cl.
*H02M 3/156* (2006.01)
*H02M 3/335* (2006.01)
*H02M 1/00* (2006.01)

(52) U.S. Cl.
CPC ....... *H02M 3/156* (2013.01); *H02M 3/33507* (2013.01); *H02M 2001/0025* (2013.01); *H02M 2001/0048* (2013.01); *H02M 2003/1566* (2013.01); *Y02B 70/1491* (2013.01)

(58) Field of Classification Search
CPC ......... H02M 3/156; H02M 2001/0025; H02M 2001/0048; H02M 2003/1566; H02M 3/33507; H02M 2001/0019
See application file for complete search history.

(56) References Cited

U.S. PATENT DOCUMENTS

| 2009/0261797 | A1* | 10/2009 | Shibata | H02M 1/36 323/288 |
|---|---|---|---|---|
| 2010/0194445 | A1* | 8/2010 | Balakrishnan | H02M 3/33507 327/108 |
| 2012/0281438 | A1* | 11/2012 | Fang | H02M 3/33507 363/21.12 |
| 2015/0280574 | A1* | 10/2015 | Gong | H02M 3/33507 363/21.12 |
| 2017/0077820 | A1* | 3/2017 | Lu | H02M 3/33523 |
| 2017/0141687 | A1* | 5/2017 | Lin | H02M 3/33507 |

* cited by examiner

*Primary Examiner* — Gary L Laxton
*Assistant Examiner* — Demetries A Gibson
(74) *Attorney, Agent, or Firm* — Winston Hsu (57) ABSTRACT

A control circuit for compensating output loss of a power converter includes a sampling voltage generator, a time-to-voltage converter, and a compensation signal generator. The sampling voltage generator generates a sampling voltage corresponding to a detection voltage according to a first reference current, a second reference current, and the detection voltage. The time-to-voltage converter generates a corresponding voltage according to a period of a gate control signal controlling a power switch of a primary side of the power converter and a discharge time of a secondary side of the power converter. The compensation signal generator generates a compensation signal compensating the output loss according to the sampling voltage and the corresponding voltage.

14 Claims, 6 Drawing Sheets

CONTROL CIRCUIT FOR COMPENSATING OUTPUT LOSS OF A POWER CONVERTER AND METHOD THEREOF

BACKGROUND OF THE INVENTION

1. Field of the Invention

The present invention relates to a control circuit for compensating output loss of a power converter and a method thereof, and particularly to a control circuit and a method thereof that can generate a compensation signal to make a compensation voltage be linearly positively changed with a load coupled to a secondary side of a power converter.

2. Description of the Prior Art

Figure 1:
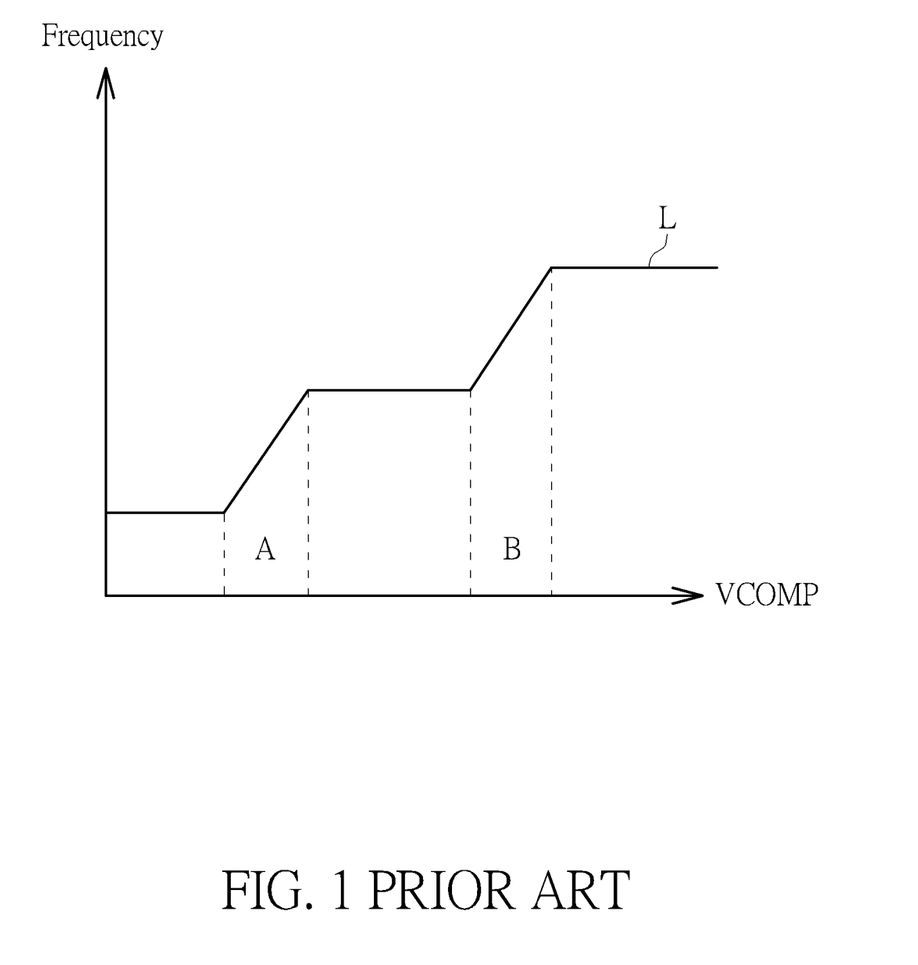
FIG. 1 is a diagram illustrating a compensation voltage being not linearly positively changed with a load coupled to a secondary side of a power converter within frequency variation regions of a frequency variation curve.

In the prior art, a control circuit applied to a primary side of the power converter can utilize a voltage corresponding to an auxiliary winding of the power converter and a compensation voltage VCOMP corresponding to an output voltage of a secondary side of the power converter to regulate the output voltage of the secondary side of the power converter and compensate output loss of the secondary side of the power converter. However, because the prior art also simultaneously utilize the compensation voltage VCOMP to determine a frequency variation curve L corresponding to a gate control signal (as shown in FIG. 1, wherein the gate control signal is used for controlling turning-on and turning-off of a power switch of the primary side of the power converter), and the compensation voltage VCOMP is not linearly positively changed with a load coupled to the secondary side of the power converter within frequency variation regions A, B (shown in FIG. 1) of the frequency variation curve L, compensation corresponding to the output loss is also non-linear, resulting in an error corresponding to the output voltage of the secondary side of the power converter being increased. Therefore, regulation effect of the prior art is poor.

SUMMARY OF THE INVENTION

An embodiment of the present invention provides a control circuit for compensating output loss of a power converter. The control circuit includes a sampling voltage generator, a time-to-voltage converter, and a compensation signal generator, and the sampling voltage generator includes a sampling time signal generator and a voltage generator. The sampling time signal generator is used for generating a sampling time signal according to a first reference current and a second reference current. The voltage generator is coupled to the sampling time signal generator for generating a sampling voltage corresponding to a detection voltage according to the detection voltage and the sampling time signal. The time-to-voltage converter is used for generating a corresponding voltage according to a period of a gate control signal controlling a power switch of a primary side of the power converter and a discharge time of a secondary side of the power converter. The compensation signal generator is coupled to the sampling voltage generator and the time-to-voltage converter for generating a compensation signal compensating the output loss according to the sampling voltage and the corresponding voltage.

Another embodiment of the present invention provides a method for compensating output loss of a power converter, wherein a control circuit applied to the method includes a sampling voltage generator, a time-to-voltage converter, and a compensation signal generator, and the sampling voltage generator includes a sampling time signal generator and a sampling voltage generator. The method includes the sampling voltage generator generating a sampling voltage corresponding to a detection voltage according to a first reference current, a second reference current, and the detection voltage; the time-to-voltage converter generating a corresponding voltage according to a period of a gate control signal controlling a power switch of a primary side of the power converter and a discharge time of a secondary side of the power converter; and the compensation signal generator generating a compensation signal for compensating the output loss according to the sampling voltage and the corresponding voltage.

The present invention provides a control circuit for compensating output loss of a power converter and a method thereof. The control circuit and the method utilize a sampling time signal generator to generate a sampling voltage corresponding to a detection voltage, utilize a time-to-voltage converter to generate a corresponding voltage according to a period of a gate control signal for controlling a power switch of a primary side of the power converter and a discharge time of a secondary side of the power converter, and utilize a compensation signal generator to generate a compensation signal compensating the output loss of the secondary side of the power converter according to the sampling voltage and the corresponding voltage. Because the corresponding voltage is linearly positively changed with the period of the gate control signal and the discharge time of the secondary side of the power converter, and the sampling voltage is changed with the detection voltage, the compensation signal is linearly positively changed with an average output current of the secondary side of the power converter. That is, the compensation signal can make the compensation voltage be linearly positively changed with a load coupled to the secondary side of the power converter. Therefore, compared to the prior art, because the compensation signal can make the compensation voltage be linearly positively changed with the load coupled to the secondary side of the power converter, the present invention can be free from a disadvantage of poor regulation effect of the prior art.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
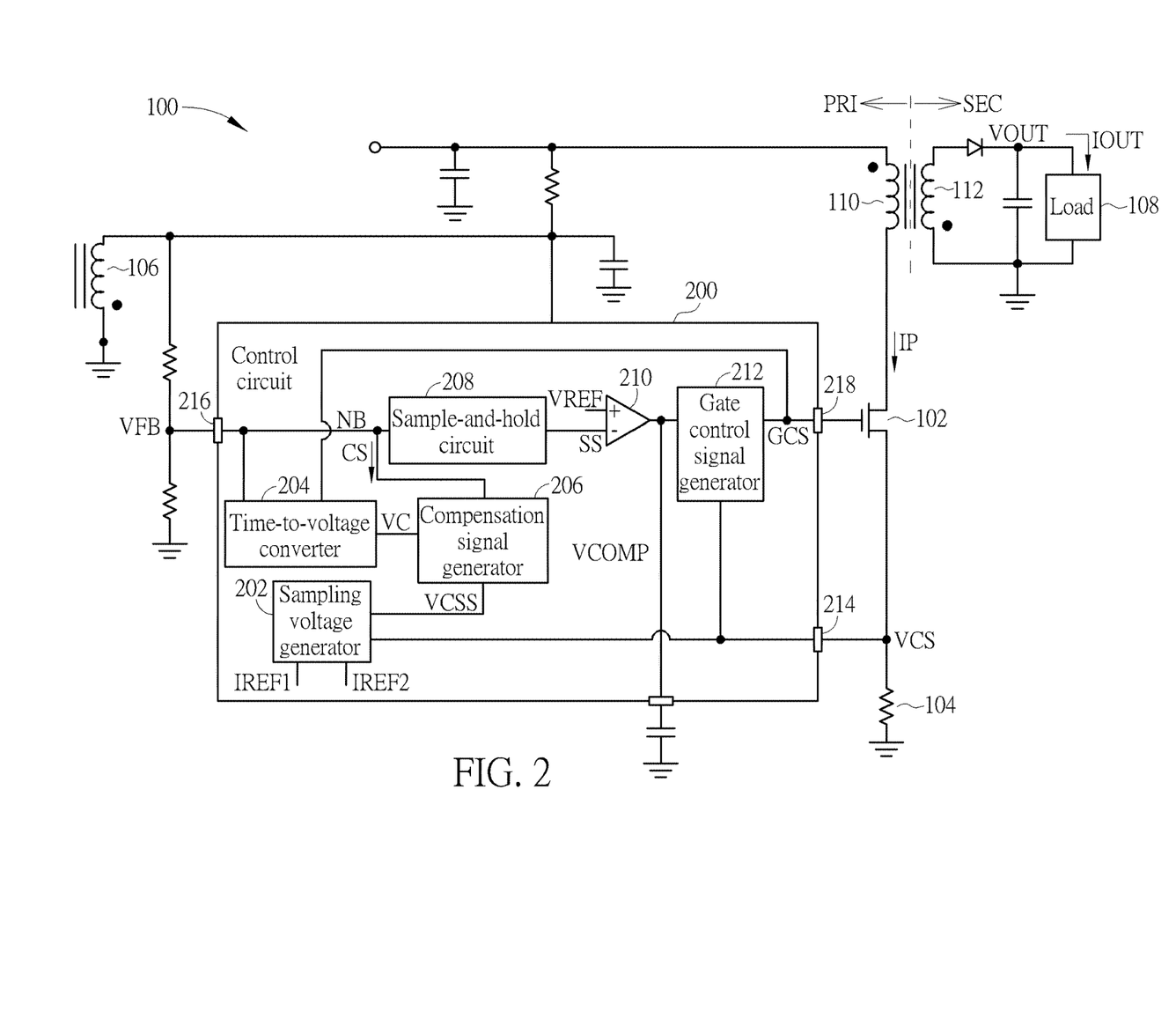
FIG. 2 is a diagram illustrating a control circuit for compensating output loss of a power converter according to a first embodiment of the present invention.

Please refer to FIG. 2. FIG. 2 is a diagram illustrating a control circuit 200 for compensating output loss of a power converter 100 according to a first embodiment of the present invention, wherein the power converter 100 is a flyback power converter. But, the present invention is not limited to the power converter 100 being a flyback power converter. As shown in FIG. 2, the control circuit 200 includes a sampling voltage generator 202, a time-to-voltage converter 204, a compensation signal generator 206, a sample-and-hold circuit 208, an error amplifier 210, and a gate control signal generator 212. As shown in FIG. 2, the sampling voltage generator 202 is used for generating a sampling voltage VCSS corresponding to a detection voltage VCS according to a first reference current IREF1, a second reference current IREF2, and the detection voltage VCS, wherein the sampling voltage generator 202 receives the detection voltage VCS through a pin 214 of the control circuit 200, the detection voltage VCS is determined by a primary side current IP flowing through a power switch 102 of a primary side PRI of the power converter 100 and a resistor 104, the first reference current IREF1 is K times to the second reference current IREF2, and in one embodiment of the present invention, K is ½. The time-to-voltage converter 204 is used for generating a corresponding voltage VC according to a period T of a gate control signal GCS controlling the power switch 102 and a discharge time TDIS of the secondary side SEC of the power converter 100, wherein the time-to-voltage converter 204 receives a voltage VFB through a pin 216 of the control circuit 200, the discharge time TDIS of the secondary side SEC of the power converter 100 corresponds to the voltage VFB, the voltage VFB corresponds to an auxiliary winding 106 of the primary side PRI of the power converter 100, the time-to-voltage converter 204 can be a low-pass filter (but, the present invention is not limited to the time-to-voltage converter 204 being a low-pass filter), and relationships between a voltage value VCV corresponding to the corresponding voltage VC, the period T of the gate control signal GCS, and the discharge time TDIS of the secondary side SEC of the power converter 100 can be determined by equation (1), wherein H is a constant:

$$VCV = \frac{TDIS}{T} \times H \qquad (1)$$

In addition, as shown in FIG. 2, the compensation signal generator 206 is coupled to the sampling voltage generator 202 and the time-to-voltage converter 204 for generating a compensation signal CS compensating the output loss of the secondary side SEC of the power converter 100 according to the sampling voltage VCSS and the corresponding voltage VC.

In addition, as shown in FIG. 2, the sample-and-hold circuit 208 is coupled to the compensation signal generator 206 and the pin 216 for generating a sampling signal SS according to the compensation signal CS and the voltage VFB; the error amplifier 210 is coupled to the sample-and-hold circuit 208 for generating a compensation voltage VCOMP according to the sampling signal SS and a reference voltage VREF; and the gate control signal generator 212 is coupled to the error amplifier 210 and the pin 214 for generating the gate control signal GCS according to the compensation voltage VCOMP and the detection voltage VCS, wherein the gate control signal generator 212 transmits the gate control signal GCS to the power switch 102 through a pin 218 of the control circuit 200, and the power switch 102 is turned on and turned off according to the gate control signal GCS.

Figure 3:
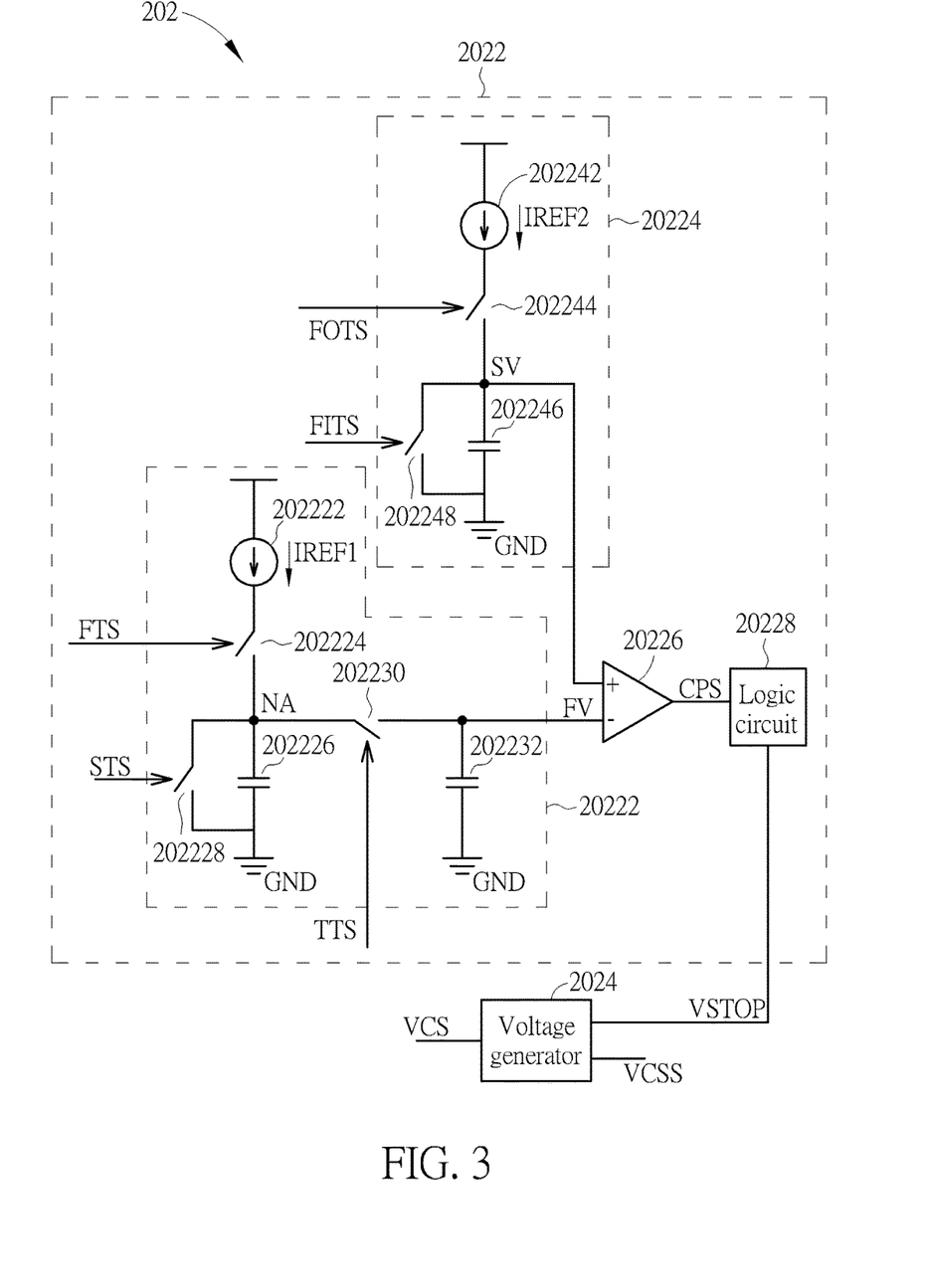
FIG. 3 is a diagram illustrating the sampling voltage generator.

Please refer to FIG. 3. FIG. 3 is a diagram illustrating the sampling voltage generator 202. As shown in FIG. 3, the sampling voltage generator 202 includes a sampling time signal generator 2022 and a voltage generator 2024. As shown in FIG. 3, the sampling time signal generator 2022 includes a first voltage generation unit 20222, a second voltage generation unit 20224, a comparator 20226, and a logic circuit 20228. The first voltage generation unit 20222 is used for generating a first voltage FV according to a first turning-on signal FTS and the first reference current IREF1; and the second voltage generation unit 20224 is used for generating a second voltage SV according to a fourth turning-on signal FOTS and the second reference current IREF2.

As shown in FIG. 3, the first voltage generation unit 20222 includes a first current source 202222, a first switch 202224, a first capacitor 202226, a second switch 202228, a third switch 202230, and a second capacitor 202232. As shown in FIG. 3, the first current source 202222 is used for providing the first reference current IREF1. The first switch 202224 is coupled to the first current source 202222, wherein the first switch 202224 is turned on and turned off according to the first turning-on signal FTS. The first capacitor 202226 is coupled between the first switch 202224 and ground GND, wherein when the first switch 202224 is turned on according to the first turning-on signal FTS, the first reference current IREF1 charges the first capacitor 202226 to generate a voltage VNA of a node NA within the first voltage generation unit 20222. The second switch 202228 is coupled between the first switch 202224 and the ground GND, wherein the second switch 202228 is turned on and turned off according to a second turning-on signal STS. The third switch 202230 is coupled to the first switch 202224, the first capacitor 202226, and the second switch 202228, wherein the third switch 202230 is turned on and turned off according to a third turning-on signal TTS. The second capacitor 202232 is coupled to the third switch 202230, the comparator 20226, and the ground GND, wherein the second capacitor 202232 is used for storing a peak value (that is, the first voltage FV) of the voltage VNA when the third switch 202230 is turned on according to the third turning-on signal TTS.

As shown in FIG. 3, the second voltage generation unit 20224 includes a second current source 202242, a fourth switch 202244, a third capacitor 202246, and a fifth switch 202248. The second current source 202242 is used for providing the second reference current IREF2. The fourth switch 202244 is coupled to the second current source 202242, wherein the fourth switch 202244 is turned on and turned off according to the fourth turning-on signal FOTS. The third capacitor 202246 is coupled between the fourth switch 202244 and the ground GND, wherein when the fourth switch 202244 is turned on according to the fourth turning-on signal FOTS, the second reference current IREF2 charges the third capacitor 202246 to generate the second voltage SV, a capacitance of the third capacitor 202246, a capacitance of the second capacitor 202232, and a capacitance of the first capacitor 202226 are identical. The fifth switch 202248 is coupled between the fourth switch 202244 and the ground GND, wherein the fifth switch 202248 is turned on and turned off according to a fifth turning-on signal FITS. In addition, the control circuit 200 further includes a signal generation circuit (not shown in FIG. 3) for generating the first turning-on signal FTS, the second turning-on signal STS, the third turning-on signal TTS, the fourth turning-on signal FOTS, and the fifth turning-on signal FITS. In addition, as shown in FIG. 3, the comparator 20226 is coupled to the first voltage generation unit 20222 and the second voltage generation unit 20224, and the logic circuit 20228 is coupled to the comparator 20226.

Figure 4:
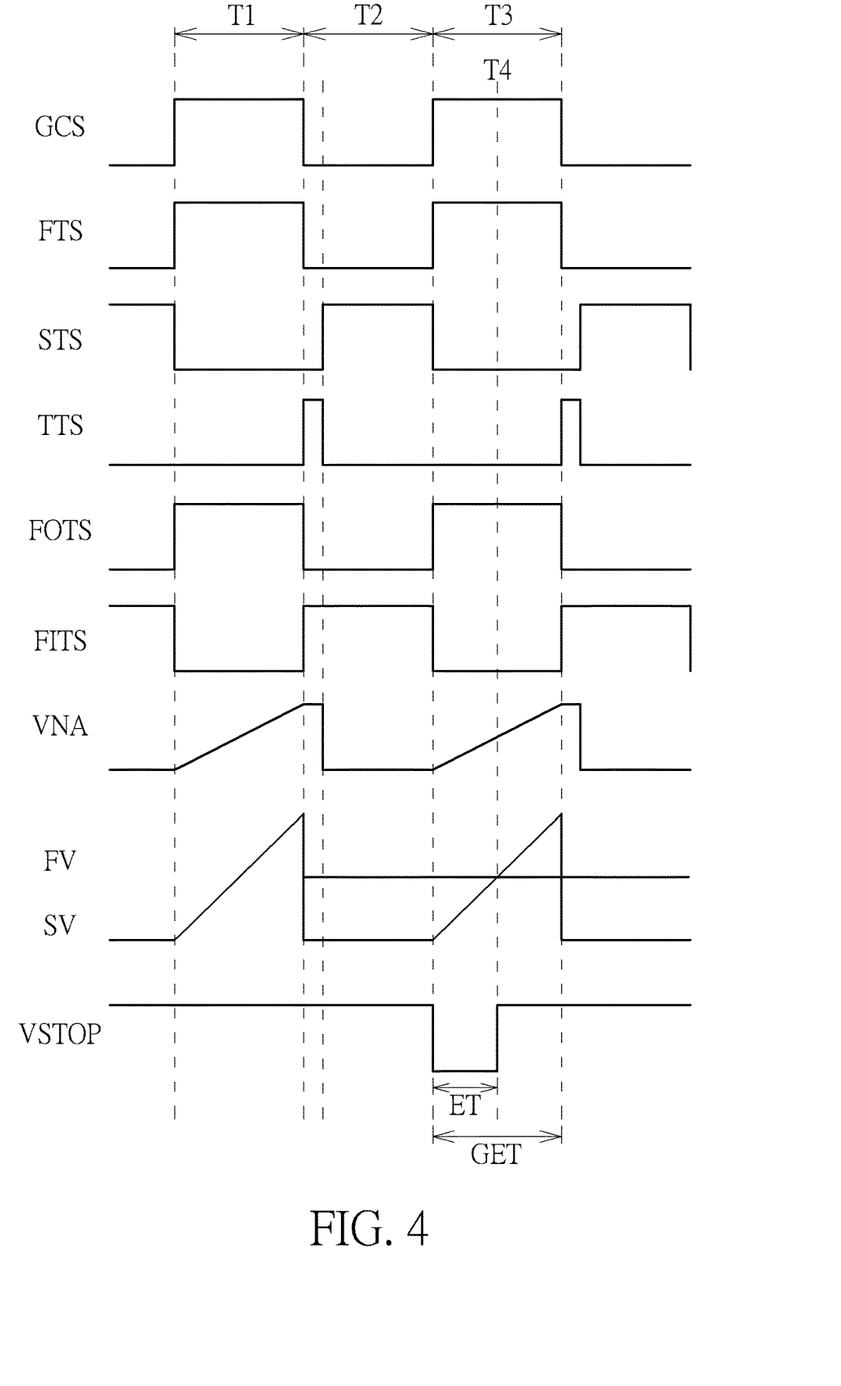
FIG. 4 is a timing diagram illustrating the gate control signal for controlling turning-on and turning-off of the power switch, the first turning-on signal, the second turning-on signal, the third turning-on signal, the fourth turning-on signal, the fifth turning-on signal, the first voltage, the second voltage, the voltage of the node, and a sampling time signal.

Please refer to FIG. 4. FIG. 4 is a timing diagram illustrating the gate control signal GCS for controlling turning-on and turning-off of the power switch 102, the first turning-on signal FTS, the second turning-on signal STS, the third turning-on signal TTS, the fourth turning-on signal FOTS, the fifth turning-on signal FITS, the first voltage FV, the second voltage SV, the voltage VNA of the node NA, and a sampling time signal VSTOP. As shown in FIG. 3 and FIG. 4, during a time interval T1, because the first turning-on signal FTS is enabled (wherein an enabling-time of the first turning-on signal FTS is equal to an enabling-time of the gate control signal GCS), the first switch 202224 is turned on, resulting in the first reference current IREF1 starting to charge the first capacitor 202226. Because the first reference current IREF1 starts to charge the first capacitor 202226, the voltage VNA of the node NA starts to be increased gradually until the first turning-on signal FTS is disabled. Similarly, during the time interval T1, because the fourth turning-on signal FOTS is enabled (wherein an enabling-time of the fourth turning-on signal FOTS is also equal to the enabling-time of the gate control signal GCS), the fourth switch 202244 is turned on, resulting in the second reference current IREF2 starting to charge the third capacitor 202246. Because the second reference current IREF2 starts to charge the third capacitor 202246, the second voltage SV starts to be increased gradually until the fourth turning-on signal FOTS is disabled.

As shown in FIG. 3 and FIG. 4, during a time interval T2, between a negative edge of the first turning-on signal FTS and a positive edge of the gate control signal GCS, the third turning-on signal TTS is enabled. Therefore, the second capacitor 202232 stores the voltage VNA corresponding to the time interval T1 to generate the first voltage FV corresponding to the time interval T1 when the third switch 202230 is turned on according to the third turning-on signal TTS, that is, the first voltage FV corresponding to the time interval T1 is equal to a peak value of the voltage VNA corresponding to the time interval T1. In addition, as shown in FIG. 4, during the time interval T2, after the third turning-on signal TTS is disabled, the second turning-on signal STS is enabled, so the second switch 202228 can be turned on according to the second turning-on signal STS to remove residual charges of the first capacitor 202226. That is to say, when the time interval T2 is finished, a voltage stored in the first capacitor 202226 is equal to potential of the ground GND, and the second capacitor 202232 still stores the first voltage FV corresponding to the time interval T1. Similarly, during the time interval T2, because the fifth turning-on signal FITS is enabled, the fifth switch 202248 is turned on to remove residual charges of the third capacitor 202246. That is to say, when the time interval T2 is finished, a voltage stored in the third capacitor 202246 is also equal to the potential of the ground GND.

As shown in FIG. 3 and FIG. 4, during a time interval T3, the second capacitor 202232 still stores the first voltage FV corresponding to the time interval T1. Because the fourth turning-on signal FOTS is enabled again, the fourth switch 202244 is turned on, resulting in the second reference current IREF2 starting to charge the third capacitor 202246 again. Because the second reference current IREF2 starts to charge the third capacitor 202246 again, the second voltage SV corresponding to the time interval T3 starts to be increased gradually. As shown in FIG. 4, at a time T4, because the second voltage SV corresponding to the time interval T3 is greater than the first voltage FV corresponding to the time interval T1, the comparator 20226 can generate a comparison signal CPS accordingly. Then, the logic circuit 20228 can generate the sampling time signal VSTOP according to the comparison signal CPS, wherein because the first reference current IREF is K times to the second reference current IREF2, and enabling-time ET of the sampling time signal VSTOP is K times to the enabling-time (that is, GET shown in FIG. 4) of the gate control signal GCS (wherein, GET is equal to the time interval T3). That is, a relationship between the enabling-time ET of the sampling time signal VSTOP and the enabling-time (that is, GET shown in FIG. 4) of the gate control signal GCS can be determined by equation (2):

$$ET = K \times GET \quad (2)$$

In addition, after the logic circuit 20228 generates the sampling time signal VSTOP, the voltage generator 2024 coupled to the logic circuit 20228 can generate the sampling voltage VCSS corresponding to the detection voltage VCS according to the sampling time signal VSTOP and the detection voltage VCS.

In addition, the present invention is not limited to potential of the first turning-on signal FTS, the second turning-on signal STS, the third turning-on signal TTS, the fourth turning-on signal FOTS, and the fifth turning-on signal FITS shown in FIG. 4. That is, any that the sampling time signal generator 2022 generates the first voltage FV and the second voltage SV shown in FIG. 4 according to the first turning-on signal FTS, the second turning-on signal STS, the third turning-on signal TTS, the fourth turning-on signal FOTS, and the fifth turning-on signal FITS falls within the scope of the present invention. In addition, the present invention is also not limited to the first voltage FV being inputted to a negative input terminal of the comparator 20226 and the second voltage SV being inputted to a positive input terminal of the comparator 20226. That is, the first voltage FV can also be inputted to the positive input terminal of the comparator 20226 and the second voltage SV can also be inputted to the negative input terminal of the comparator 20226. Meanwhile, only the logic circuit 20228 needs to be adjusted accordingly to respond an inverse comparison signal generated by the comparator 20226.

Figure 5:
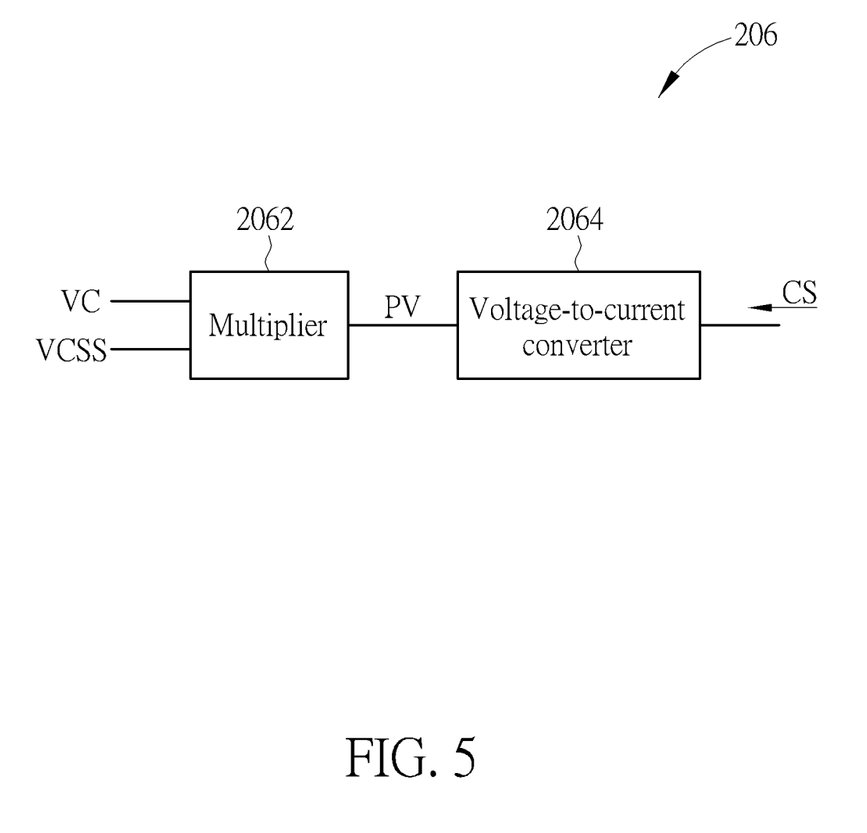
FIG. 5 is a diagram illustrating the compensation signal generator.

Please refer to FIG. 5. FIG. 5 is a diagram illustrating the compensation signal generator 206. As shown in FIG. 5, the compensation signal generator 206 includes a multiplier 2062 and a voltage-to-current converter 2064. The multiplier 2062 is coupled to the voltage generator 2024 of the sampling voltage generator 202 and the time-to-voltage converter 204, wherein the multiplier 2062 generates a product value PV according to the sampling voltage VCSS and the corresponding voltage VC, and relationships between the product value PV, the sampling voltage VCSS, and the corresponding voltage VC can be determined by equation (3):

$$PV = VCSS \times VC \quad (3)$$

In addition, the voltage-to-current converter 2064 is coupled to the multiplier 2062, wherein the voltage-to-current converter 2064 sinks a current signal (that is, the compensation signal CS) according to the product value PV, so as shown in equation (3), the compensation signal CS is linearly positively changed with the product value PV.

In addition, please refer to equation (4). Equation (4) can be used for describing an average output current IOUT flowing through a load 108 coupled to the secondary side SEC of the power converter 100.

$$IOUT = \frac{NP}{NS} \times \frac{VCSP + VCSL}{2 \times RS} \times \frac{TDIS}{T} \quad (4)$$

As shown in equation (4), $$\frac{NP}{NS}$$

is a turns ratio of a winding 110 of the primary side PRI of the power converter 100 to a winding 112 of secondary side SEC of the power converter 100, VCSP is a peak value of the detection voltage VCS when the power switch 102 is turned on (corresponding to the enabling-time of the gate control signal GCS), VCSL is a default value of the detection voltage VCS when the power switch 102 is turned on, and RS is a resistance of the resistor 104.

Because the relationship between the enabling-time ET of the sampling time signal VSTOP and the enabling-time (that is, GET shown in FIG. 4) of the gate control signal GCS can be determined by equation (2), the sampling voltage VCSS generated by the voltage generator 2024 sampling the detection voltage VCS during the sampling time signal VSTOP can be determined by equation (5):

$$VCSS = \frac{VCSP + VCSL}{2} \quad (5)$$

Substituting equation (5) and equation (1) into equation (3) yields equation (6):

$$PV = VCSS \times VC \quad (6)$$
$$= \frac{VCSP + VCSL}{2} \times \frac{TDIS}{T} \times H$$

Substituting equation (6) into equation (4) can yield equation (7):

$$IOUT = \frac{NP}{NS} \times \frac{VCSP + VCSL}{2 \times RS} \times \frac{TDIS}{T} \quad (7)$$
$$= \frac{NP}{NS} \times \frac{1}{RS} \times \frac{PV}{H}$$

As shown in equation (7), because $$\frac{NP}{NS}$$

and RS are fixed values, and H is a constant, the product value PV is directly proportional to the average output current IOUT. In addition, because the voltage-to-current converter 2064 can sink the current signal (the compensation signal CS) according to the product value PV, the compensation signal CS is also linearly positively changed with the average output current IOUT.

Therefore, as shown in FIG. 2, when the compensation signal CS is increased, the voltage VFB is decreased, resulting in a difference between the sampling signal SS and the reference voltage VREF being increased. Because the difference between the sampling signal SS and the reference voltage VREF is increased, the compensation voltage VCOMP is increased, resulting in a duty cycle of the gate control signal GCS being increased. Therefore, when the compensation signal CS is increased, because the duty cycle of the gate control signal GCS is increased, an output voltage VOUT of the secondary side SEC of the power converter 100 is increased to make a value of the sampling signal SS be equal to a value of the reference voltage VREF. That is, the compensation signal CS can make the compensation voltage VCOMP be linearly positively changed with the load 108 coupled to the secondary side SEC of the power converter 100 to free from a disadvantage of poor regulation effect of the prior art. In addition, the compensation signal CS is not influenced by a frequency of the gate control signal GCS.

In addition, because the default value VCSL of the detection voltage VCS is equal to 0 in a discrete continuous mode (DCM) of the power converter 100, the present invention can be also suitable for the discrete continuous mode of the power converter 100.

In addition, in another embodiment of the present invention, the control circuit 200 further includes a low-pass filter coupled between a node NB (as shown in FIG. 2) and the compensation signal generator 206, wherein the low-pass filter is used for reducing a frequency of the compensation signal CS.

In addition, in another embodiment of the present invention, K is a real number between 0 and 1. For example, K can be 0.3, 0.4, 0.45, 0.55, or 0.6 etc.

Figure 6:
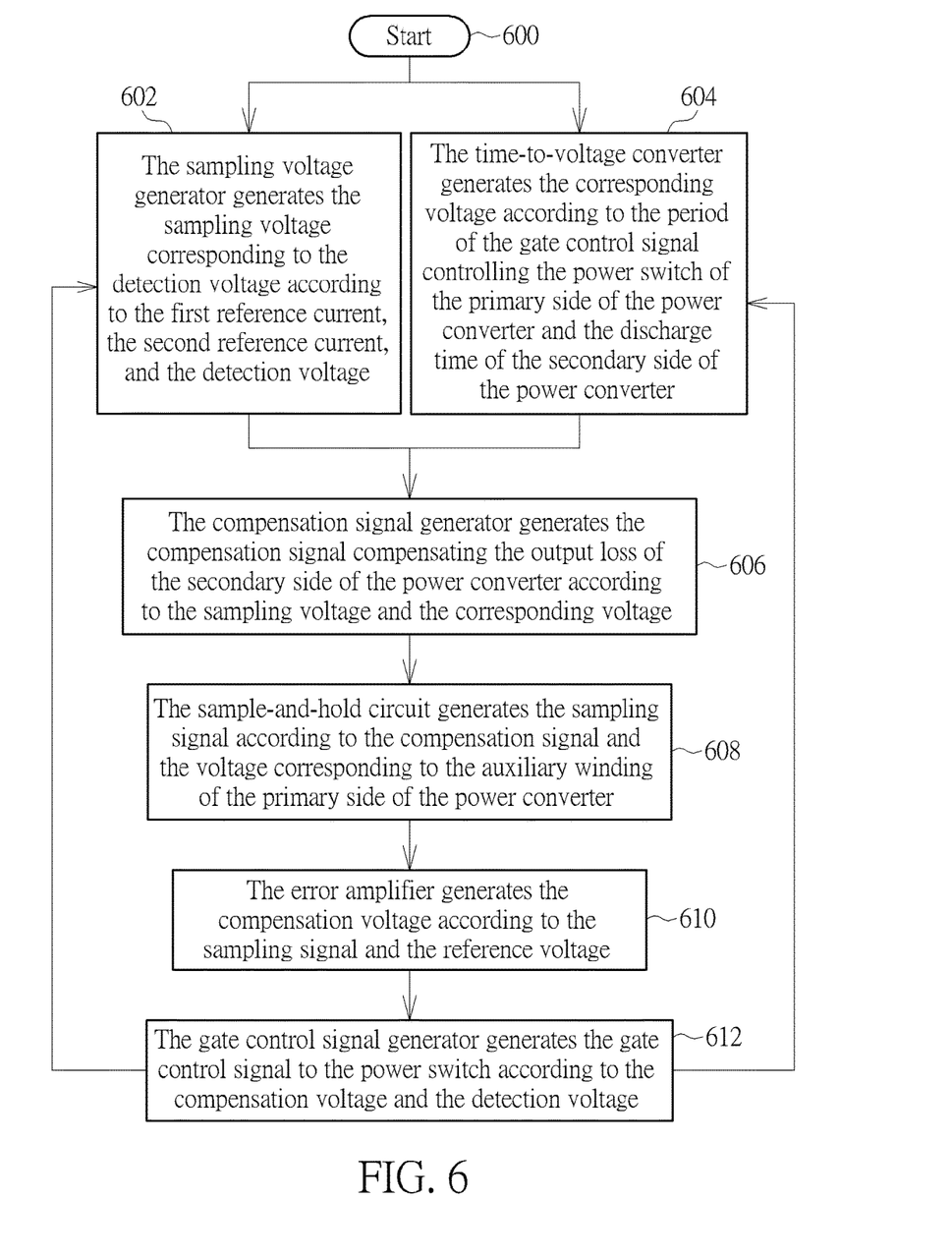
FIG. 6 is a flowchart illustrating a method for compensating output loss of a power converter according to a second embodiment of the present invention.

Please refer to FIGS. 2-6. FIG. 6 is a flowchart illustrating a method for compensating output loss of a power converter according to a second embodiment of the present invention. The method in FIG. 6 is illustrated using the power converter 100 and the control circuit 200 in FIG. 2. Detailed steps are as follows:

Step 600: start.

Step 602: The sampling voltage generator 202 generates the sampling voltage VCSS corresponding to the detection voltage VCS according to the first reference current IREF1, the second reference current IREF2, and the detection voltage VCS.

Step 604: The time-to-voltage converter 204 generates the corresponding voltage VC according to the period T of the gate control signal GCS controlling the power switch 102 of the primary side PRI of the power converter 100 and the discharge time TDIS of the secondary side SEC of the power converter 100.

Step 606: The compensation signal generator 206 generates the compensation signal CS compensating the output loss of the secondary side SEC of the power converter 100 according to the sampling voltage VCSS and the corresponding voltage VC.

Step 608: The sample-and-hold circuit 208 generates the sampling signal SS according to the compensation signal CS and the voltage VFB corresponding to the auxiliary winding 106 of the primary side PRI of the power converter 100.

Step 610: The error amplifier 210 generates the compensation voltage VCOMP according to the sampling signal SS and the reference voltage VREF.

Step 612: The gate control signal generator 212 generates the gate control signal GCS to the power switch 102 according to the compensation voltage VCOMP and the detection voltage VCS, go to Step 602 and Step 604.

In Step 602, as shown in FIG. 3 and FIG. 4, during the time interval T1, because the first turning-on signal FTS is enabled, the first switch 202224 is turned on, resulting in the first reference current IREF1 starting to charge the first capacitor 202226. Because the first reference current IREF1 starts to charge the first capacitor 202226, the voltage VNA of the node NA starts to be increased gradually until the first turning-on signal FTS is disabled.

As shown in FIG. 3 and FIG. 4, during the time interval T2, between the negative edge of the first turning-on signal FTS and the positive edge of the gate control signal GCS, third turning-on signal TTS is enabled. Therefore, the second capacitor 202232 stores the voltage VNA corresponding to the time interval T1 to generate the first voltage FV corresponding to the time interval T1 when the third switch 202230 is turned on according to the third turning-on signal TTS (that is, the first voltage FV corresponding to the time interval T1 is equal to the peak value of the voltage VNA corresponding to the time interval T1).

As shown in FIG. 3 and FIG. 4, during the time interval T3, the second capacitor 202232 still stores the first voltage FV corresponding to the time interval T1. Because the fourth turning-on signal FOTS is enabled again, the fourth switch 202244 is turned on, resulting in the second reference current IREF2 starting to charge the third capacitor 202246 again. Because the second reference current IREF2 starts to charge the third capacitor 202246 again, the second voltage SV corresponding to the time interval T3 starts to be increased gradually.

As shown in FIG. 3 and FIG. 4, at the time T4, because the second voltage SV corresponding to the time interval T3 is greater than the first voltage FV corresponding to the time interval T1, the comparator 20226 can generate the comparison signal CPS accordingly. Then, the logic circuit 20228 can generate the sampling time signal VSTOP according to the comparison signal CPS, wherein because the first reference current IREF is K times to the second reference current IREF2 (in one embodiment of the present invention, K is ½), the enabling-time ET of the sampling time signal VSTOP is K times to the enabling-time (that is, GET shown in FIG. 4) of the gate control signal GCS (wherein, GET is equal to the time interval T3). That is, the relationship between the enabling-time ET of the sampling time signal VSTOP and the enabling-time (that is, GET shown in FIG. 4) of the gate control signal GCS can be determined by equation (2). In addition, in another embodiment of the present invention, K is a real number between 0 and 1. For example, K can be 0.3, 0.4, 0.45, 0.55, or 0.6 etc. After the logic circuit 20228 generates the sampling time signal VSTOP, the voltage generator 2024 coupled to the logic circuit 20228 can generate the sampling voltage VCSS corresponding to the detection voltage VCS according to the sampling time signal VSTOP and the detection voltage VCS.

In Step 604, the time-to-voltage converter 204 generates the corresponding voltage VC according to the period T of the gate control signal GCS controlling the power switch 102 and the discharge time TDIS of the secondary side SEC of the power converter 100, wherein the discharge time TDIS of the secondary side SEC of the power converter 100 corresponds to voltage VFB, the voltage VFB corresponds to the auxiliary winding 106 of the primary side PRI of the power converter 100, the time-to-voltage converter 204 can be a low-pass filter (but, the present invention is not limited to time-to-voltage converter 204 being a low-pass filter), and the relationships between the voltage value VCV of the corresponding voltage VC, the period T of the gate control signal GCS, and the discharge time TDIS of the secondary side SEC of the power converter 100 can be determined by equation (1), wherein H is a constant.

In Step 606, as shown in FIG. 5, the multiplier 2062 of the compensation signal generator 206 generates the product value PV according to the sampling voltage VCSS and the corresponding voltage VC, wherein the relationships between the product value PV, the sampling voltage VCSS, and the corresponding voltage VC can be determined by equation (3). In addition, as shown in FIG. 5, the voltage-to-current converter 2064 of the compensation signal generator 206 sinks the current signal (that is, the compensation signal CS) according to the product value PV, so as shown in equation (3), the compensation signal CS is linearly positively changed with the product value PV.

In Step 608, as shown in FIG. 2, the sample-and-hold circuit 208 generates the sampling signal SS according to the compensation signal CS and the voltage VFB. In Step 610, the error amplifier 210 generates the compensation voltage VCOMP according to the sampling signal SS and the reference voltage VREF. In Step 612, the gate control signal generator 212 generates the gate control signal GCS according to the compensation voltage VCOMP and the detection voltage VCS, wherein the power switch 102 is turned on and turned off according to the gate control signal GCS.

As shown in equation (7), because $$\frac{NP}{NS}$$

and RS are fixed values, and H is a constant, the product value PV is directly proportional to the average output current IOUT. In addition, because the voltage-to-current converter 2064 can sink the current signal (the compensation signal CS) according to the product value PV, the compensation signal CS is also linearly positively changed with the average output current IOUT.

Therefore, as shown in FIG. 2, when the compensation signal CS is increased, the voltage VFB is decreased, resulting in the difference between the sampling signal SS and the reference voltage VREF being increased. Because the difference between the sampling signal SS and the reference voltage VREF is increased, the compensation voltage VCOMP is increased, resulting in the duty cycle of the gate control signal GCS being increased. Therefore, when the compensation signal CS is increased, because the duty cycle of the gate control signal GCS is increased, the output voltage VOUT of the secondary side SEC of the power converter 100 is increased to make the value of the sampling signal SS be equal to a value of the reference voltage VREF. That is, the compensation signal CS can make the compensation voltage VCOMP be linearly positively changed with the load 108 coupled to the secondary side SEC of the power converter 100 to free from the disadvantage of the poor regulation effect of the prior art, and the compensation signal CS is not influenced by the frequency of the gate control signal GCS.

To sum up, the control circuit for compensating the output loss of the power converter and the method thereof utilize the sampling time signal generator to generate the sampling voltage corresponding to the detection voltage, utilize the time-to-voltage converter to generate the corresponding voltage according to the period of the gate control signal for controlling the power switch of the primary side of the power converter and the discharge time of the secondary side of the power converter, and utilize the compensation signal generator to generate the compensation signal compensating the output loss of the secondary side of the power converter according to the sampling voltage and the corresponding voltage. Because the corresponding voltage is linearly positively changed with the period of the gate control signal and the discharge time of the secondary side of the power converter, and the sampling voltage is changed with the detection voltage, the compensation signal is linearly positively changed with the average output current of the secondary side of the power converter. That is, the compensation signal can make the compensation voltage be linearly positively changed with the load coupled to the secondary side of the power converter. Therefore, compared to the prior art, because the compensation signal can make the compensation voltage be linearly positively changed with the load coupled to the secondary side of the power converter, the present invention can be free from the disadvantage of the poor regulation effect of the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control circuit for compensating output loss of a power converter, the control circuit comprising:
   a sampling voltage generator, comprising:
      a sampling time signal generator for generating a sampling time signal according to a first reference current and a second reference current; and
      a voltage generator coupled to the sampling time signal generator for generating a sampling voltage corresponding to a detection voltage according to the detection voltage and the sampling time signal, wherein the sampling voltage is transmitted to a compensation signal generator;
   a time-to-voltage converter for generating a corresponding voltage to the compensation signal generator according to a period of a gate control signal controlling a power switch of a primary side of the power converter and a discharge time of a secondary side of the power converter; and
   the compensation signal generator coupled to the sampling voltage generator and the time-to-voltage converter for generating a compensation signal compensating the output loss according to the sampling voltage and the corresponding voltage.

2. The control circuit of claim 1, wherein the compensation signal generator comprises:
   a multiplier coupled to the sampling voltage generator and the time-to-voltage converter for generating a product value according to the sampling voltage and the corresponding voltage; and
   a voltage-to-current convertor coupled to the multiplier for generating the compensation signal according to the product value.

3. The control circuit of claim 1, wherein the detection voltage is determined by a primary side current of the power converter flowing through the power switch and a resistor.

4. The control circuit of claim 1, wherein the first reference current is K times to the second reference current, and $0<K<1$.

5. The control circuit of claim 1, wherein the sampling time signal generator comprises:
   a first voltage generation unit, comprising:
      a first current source for providing the first reference current;
      a first switch coupled to the first current source, wherein the first switch is turned on and turned off according to a first turning-on signal;
      a first capacitor coupled between the first snitch and ground, wherein when the first switch is turned on according to the first turning-on signal, the first reference current charges the first capacitor to generate a voltage of a node within the first voltage generation unit;
      a second switch coupled between the first switch and the ground, wherein the second switch is turned on and turned off according to a second turning-on signal;
      a third switch coupled to the first switch, the first capacitor, and the second switch, wherein the third switch is turned on and turned off according to a third turning-on signal; and
      a second capacitor coupled to the third switch and the ground for storing a peak value of the voltage of the node when the third switch is turned on according to the third turning-on signal, wherein the peek value of the voltage of the node is a first voltage, the third switch is turned on according to the third turning-on signal after the first switch is turned off according to the first turning-on signal and before a positive edge of a turning-on time of the power switch of the primary side of the power converter, a capacitance of the first capacitor is equal to a capacitance of the second capacitor, and the second switch is turned on according to the second turning-on signal to remove residual charges of the first capacitor after the first turning-on signal and the third turning-on signal are disabled;
   a second voltage generation unit, comprising:
      a second current source for providing the second reference current;
      a fourth switch coupled to the second current source, wherein the fourth switch is turned on and turned off according to a fourth turning-on signal;
      a third capacitor coupled between the fourth switch and the ground, wherein when the fourth switch is turned on according to the fourth turning-on signal, the second reference current charges the third capacitor to generate a second voltage, and a capacitance of the third capacitor is equal to the capacitance of the second capacitor; and
      a fifth switch coupled between the fourth switch and the ground, wherein the fifth switch is turned on and turned off according to a fifth turning-on signal, and the fifth switch is turned on according to the fifth turning-on signal to remove residual charges of the third capacitor after the fourth turning-on signal is disabled;

a comparator coupled to the first voltage generation unit and the second voltage generation unit for generating a comparison signal according to the first voltage and the second voltage; and a logic circuit coupled to the comparator for generating the sampling time signal according to the comparison signal.

6. The control circuit of claim 1, wherein the compensation signal corresponds to an output current of the secondary side of the power converter.

7. The control circuit of claim 1, further comprising:

a sample-and-hold circuit coupled to the compensation signal generator for generating a sampling signal according to the compensation signal and a voltage corresponding to an auxiliary winding of the primary side of the power converter, wherein the discharge time of the secondary side of the power converter corresponds to the voltage;

an error amplifier coupled to the sample-and-hold circuit for generating a compensation voltage according to the sampling signal and a reference voltage; and a gate control signal generator coupled to the era amplifier for generating the gate control signal to the power switch according to the compensation voltage and the detection voltage, wherein the power switch is turned on and turned off according to the gate control signal.

8. A method for compensating output loss of a power converter, wherein a control circuit applied to the method comprises a sampling voltage generator, a time-to-voltage converter, and a compensation signal generator, and the sampling voltage generator comprises a sampling time signal generator and a voltage generator, the method comprising:

the sampling voltage generator generating a sampling voltage corresponding to a detection voltage according to a first reference current, a second reference current, and the detection voltage, wherein the sanding voltage is transmitted to the compensation signal generator;

the time-to-voltage converter generating a corresponding voltage to the compensation signal generator according to a period of a gate control signal controlling a power switch of a primary side of the power converter and a discharge time of a secondary side of the power converter; and the compensation signal generator generating a compensation signal for compensating the output loss according to the sampling voltage and the corresponding voltage.

9. The method of the claim 8, wherein the sampling voltage generator generating the sampling voltage corresponding to the detection voltage comprises according to the first reference current, the second reference current, and the detection voltage:

the sampling time signal generator generating a sampling time signal according to the first reference current and the second reference current; and the sampling voltage generator generating the sampling voltage according to the detection voltage and the sampling time signal.

10. The method of the claim 8, wherein the compensation signal generator generating the compensation signal according to the sampling voltage and the corresponding voltage comprises:

a multiplier comprised in the compensation signal generator generating a product value according to the sampling voltage and the corresponding voltage; and a voltage-to-current converter comprised in the compensation signal generator generating the compensation signal according to the product value.

11. The method of the claim 8, wherein the detection voltage is determined by a primary side current of the power converter flowing through the power switch and a resistor.

12. The method of the claim 8, wherein the first reference current is K times to the second reference current, and $0<K<1$.

13. The method of the claim 8, wherein the compensation signal corresponds to an output current of the secondary side of the power converter.

14. The method of the claim 8, further comprising:

a sample-and-hold circuit further comprised in the control circuit generating a sampling signal according to the compensation signal and a voltage corresponding to an auxiliary winding of the primary side of the power converter, wherein the discharge time of the secondary side of the power converter corresponds to the voltage;

an error amplifier further comprised in the control circuit generating a compensation voltage according to the sampling signal and a reference voltage; and a gate control signal generator further comprised in the control circuit generating the gate control signal to the power switch according to the compensation voltage and the detection voltage, wherein the power switch is turned on and turned off according to the gate control signal.

* * * * *